Sept. 7, 1926.
B. L. MALLORY
SHOCK ABSORBING DEVICE
Filed Dec. 26, 1922   2 Sheets-Sheet 1
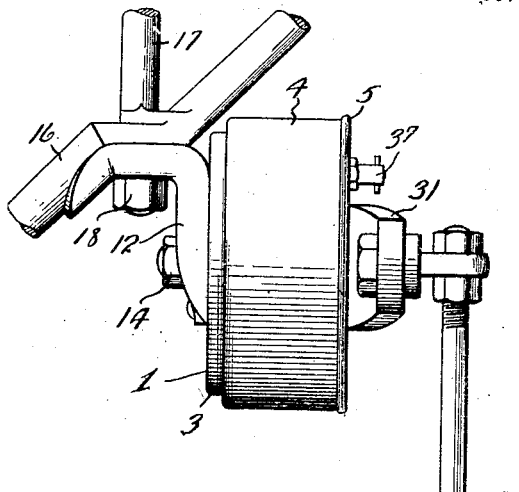
Fig. 1
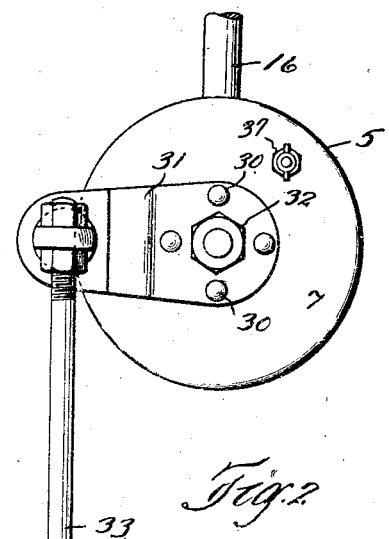
Fig. 2
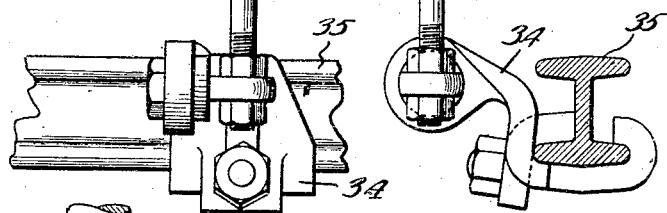
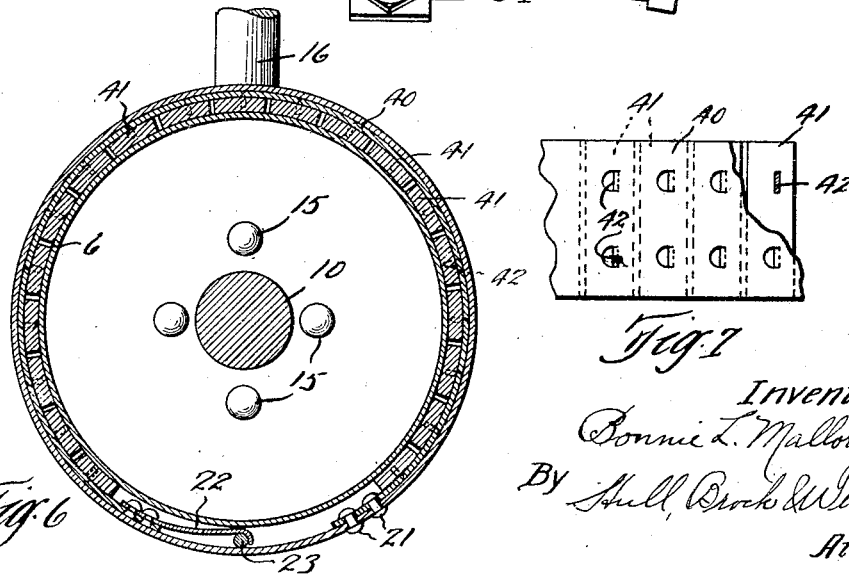
Fig. 6   Fig. 7
Inventor
Bonnie L. Mallory
By Hull, Brock & West
Attys.

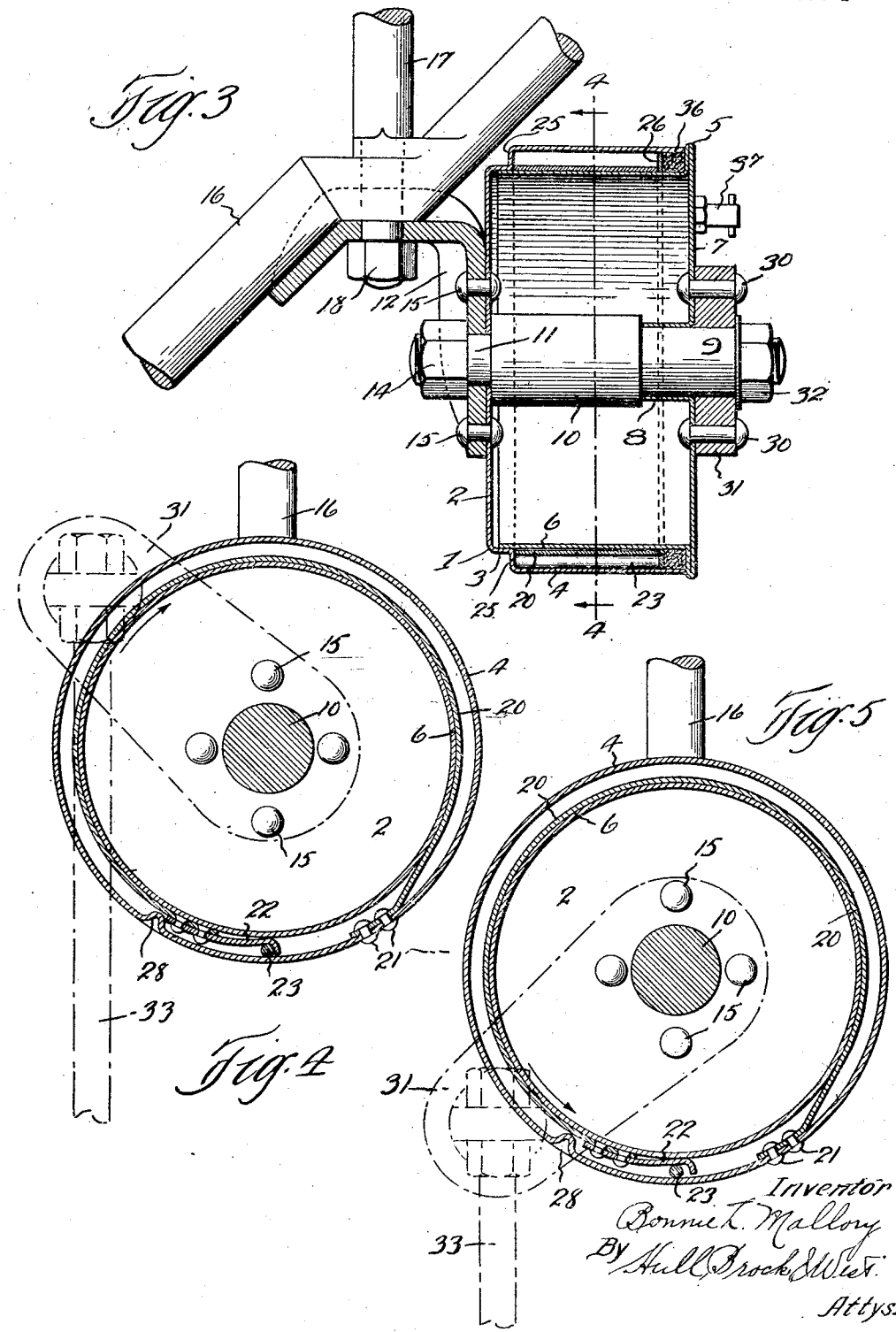

Patented Sept. 7, 1926.

1,599,368

UNITED STATES PATENT OFFICE.

BONNIE L. MALLORY, OF CLEVELAND, OHIO.

SHOCK-ABSORBING DEVICE.

Application filed December 26, 1922. Serial No. 608,817.

This invention relates to shock absorbing devices and has particular reference to a device for controlling the rebound action of a vehicle spring.

Some of the objects of the present invention are to provide a shock absorbing device which shall be devoid of springs, and fabric or woven belts and hence free from breaking or excessive stretching of these parts; to provide a shock absorbing device which may be easily attached to the vehicle frame or in the case of Ford automobiles may be attached to the head light bracket; to provide a device of the aforesaid character which shall be efficient in operation, completely enclosed and hence dust proof, and which shall consist of a minimum number of parts which are inexpensive to manufacture and assemble; while further objects and advantages will appear as the description proceeds.

In the accompanying drawings forming a part of this application, Figs. 1 and 2 are respectively front and side elevations of my device showing the same attached between the axle and head light bracket of a Ford automobile; Fig. 3 is a vertical sectional view through the housing of my device; Fig. 4 is a sectional view taken on the line 4—4 of Fig. 3 and showing the position of the elements when the vehicle spring is compressed; Fig. 5 is a similar view but showing the position of the elements at the completion of the rebound stroke of the spring; Fig. 6 is a vertical sectional view through a modified form of device; and Fig. 7 is an enlarged detail plan view showing the manner of attaching the brake shoes to the brake band.

Describing the various parts by reference characters, 1 denotes an annular sheet metal housing comprising a base portion 2 and side wall 3 which is enlarged as indicated at 4. The side of housing 1 opposite the base 2 is open, and receives therein a brake drum 5 which may also be formed from sheet metal. This drum comprises an annular braking surface 6, which is rotatably mounted within the reduced portion of side wall 3, and a base portion 7 of enlarged diameter, which closes the open side of casing 1. The central portion of base 7 is formed with an inwardly directed collar 8 which is rotatably mounted on the reduced portion 9 of a shaft 10. The opposite end of this shaft is reduced in diameter as indicated at 11 and this reduced end projects through base 2 and a supporting bracket 12, and is fastened to the latter by a nut 14 threaded on the end of said shaft. The base 2 is fastened to the bracket by a plurality of rivets 15. Bracket 12 is of channel formation and is suitably shaped to embrace the lower surface of a head light supporting arm 16. As shown in Figs. 1 and 3, a vertical lamp rod 17 projects downwardly through arm 16 and through bracket 12 and a nut 18 applied to the end of said rod secures the parts together. The head light supporting arm and rod as shown, are of standard Ford construction and in applying a shock absorbing device of this character to a Ford or other automobile employing a similar arrangement, it is only necessary to remove nut 18 and apply bracket 12 to the end of rod 17 and replace the nut.

A brake band 20 has one end thereof fastened as by means of rivets 21 to the enlarged portion 4 of casing 1 and this band encircles the braking surface 6 of brake drum 5 and at the other end, said band has fastened thereto a resilient finger 22, the end whereof is curved to embrace a roller 23 which is disposed within the enlarged portion 4 of casing 1. The shoulder 25, formed by side wall 3 and enlarged portion 4, and a washer 26, disposed about braking surface 6, define a guideway for brake band 20 and roller 23. In this connection it will be noted that resilient finger 22, which is preferably made of spring steel, is fastened to the outer surface of band 20 and the projection thus formed is adapted to contact with an inwardly directed portion 28 of casing 1, to limit the expansion of said band. The free end of finger 22 is deflected inwardly toward the brake drum, and roller 23 is of such diameter as to retain said finger in contact with said brake drum at all times.

The base 7 of brake drum 5 is fastened by means of rivets 30 to an arm 31 which is journaled on the reduced portion 9 of shaft 10, and a nut 32 threaded on the end of said shaft retains the parts in operative relation. A rod 33 is pivotally connected at one end, to the free end of arm 31 and the opposite end of this rod is pivotally connected with a clamp 34 which is attached to the vehicle axle 35 in any approved manner.

Referring to Fig. 3 it will be noted that packing material 36 is interposed between washer 26 and the base 7 of the brake drum so that the casing may be filled with lubricant through a suitable opening 37.

The operation of the device thus described is as follows: When the vehicle spring is compressed, rod 33 will be moved upwardly thereby rocking arm 31 and brake drum 6 in a clockwise direction as viewed in Fig. 4. The brake drum being in contact with finger 22, and the latter in contact with roller 23, will move said finger back against stop 28 and thereby expand the brake band and permit the brake drum to rotate freely. On the rebound action of the spring, rod 33 will move downwardly thus rocking arm 31 and drum 6 in a counter clockwise direction as viewed in Fig. 5. Rotation of brake drum 6 in this direction causes finger 22 to ride between said drum and roller 23 to tighten the brake band about the drum and thus check the rebound action of the spring. In this connection it will be noted that the checking action is progressive and is applied gradually from the start and increases with the rebound movement of the spring.

In Fig. 6 I have shown a slight modification wherein the brake band 40 is of larger diameter and is positioned against the inner surface of the enlarged portion 4 of casing 1. Wooden blocks 41 are fastened in spaced relation to the inner side of the brake band in any suitable manner as by deflecting the metal of the brake band into the wood as shown at 42 in Figs. 6 and 7. These wooden blocks form shoes which contact with the brake drum 6 in the same manner as previously described. Blocks 41 are preferably arranged with the end grain in contact with the brake drum and the end surface of these blocks soon become glazed and impart a smooth braking action on the rebound stroke of the vehicle spring.

While I have shown and described a device for mounting on Ford and other automobiles having a similar headlight arrangement, it will be obvious that the same may be applied by fastening the casing directly to the vehicle frame, the latter mounting being a well known practice and a detailed description thereof is deemed unnecessary.

Having thus described my invention, what I claim is:

1. A shock absorbing device of the character set forth comprising a casing and an element movable within said casing, means for connecting said casing and element, one to a vehicle frame and the other to the running gear of said vehicle, a friction member disposed about said movable element, and means interposed between said casing and member and adapted to tighten said member about said movable element upon movement of said running gear with respect to said frame in one direction and release said member upon movement in an opposite direction.

2. A shock absorbing device of the character set forth comprising a casing and a brake drum rotatable within said casing, means for connecting said casing and drum, one to a vehicle frame and the other to the running gear of said vehicle, a brake band disposed about said drum and having one end fixed and the other end in contact with said drum, and a movable element adapted to tighten said brake band about said drum upon movement of said running gear with respect to said frame in one direction and release upon movement in an opposite direction.

3. A shock absorbing device of the character set forth comprising a casing adapted to be connected to a vehicle frame, a brake drum rotatable in said casing and adapted to be connected with the running gear of said vehicle, a brake band connected to said casing and disposed about said drum, and a roller interposed between said casing and the free end of said brake band, said roller adapted to produce a binding effect on said brake band upon movement of the running gear in one direction with respect to said frame and to allow said brake drum to rotate freely upon movement of said running gear in the opposite direction.

4. A shock absorbing device of the character set forth comprising a casing adapted to be connected to a vehicle frame, a brake drum rotatable in said casing and adapted to be connected with the running gear of said vehicle, a brake band connected to said casing and disposed about said drum, and a roller for holding the free end of said band in contact with said drum, the roller being adapted to bind the free end of said band to said drum upon movement of said vehicle running gear with respect to said frame in one direction and loosen upon movement in an opposite direction.

5. A shock absorbing device of the character set forth comprising a casing and a brake drum rotatable within said casing, means for connecting said casing and drum, one to a vehicle frame and the other to the running gear of said vehicle, a brake band disposed about said drum and having one end connected to said casing, the other end of said band being held in frictional contact with said drum by an element engaging therewith, said element being adapted to resist a turning movement of said drum in one direction and to move with said drum when the drum is turned in the opposite direction.

6. A shock absorbing device of the character set forth comprising an annular casing having a base and a side wall, a brake drum having a base and an annular braking surface, said drum being disposed within said casing and said last mentioned base closing the open side of said casing, means for attaching said casing and drum, one to a vehicle frame and the other to a vehicle running gear, a brake band interposed between said casing and drum and disposed about said braking surface, one end of said band being connected to said casing and the other end of said band being in frictional contact with said drum, and a roller interposed between said band and casing for holding the end of said band in contact with said drum during rotation of drum and casing, one with respect to the other.

7. A shock absorbing device for the character set forth comprising an annular casing having a brake drum rotatably mounted therein, means for connecting said casing and drum, one to a vehicle frame and the other to the running gear of said vehicle, a brake band disposed about said drum and having one end thereof connected to said casing, the other end of said band being in frictional contact with said drum, and a roller disposed between said casing and band for holding the end of said band in frictional contact with said drum during rotation of said drum.

8. A shock absorbing device of the character set forth comprising a casing adapted to be secured to a vehicle frame, an element rotatable within said casing and adapted to be connected to the running gear of said vehicle, a friction member disposed about said element, and a rotatable member interposed between said casing and friction member and adapted to resist a turning movement of said rotatable member in one direction and to allow free movement of said rotatable member in the opposite direction, movement of said running gear with respect to said frame in one direction and release said friction member upon movement in an opposite direction.

In testimony whereof, I hereunto affix my signature.

BONNIE L. MALLORY.